(12) United States Patent
Takatsuji et al.

(10) Patent No.: US 6,744,777 B1
(45) Date of Patent: Jun. 1, 2004

(54) DATA TRANSFER METHOD AND DATA TRANSFER SYSTEM

(75) Inventors: Ayako Takatsuji, Osaka (JP); Takahiko Nankou, Hyogo (JP); Hiroyuki Iitsuka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/554,610

(22) PCT Filed: Oct. 5, 1999

(86) PCT No.: PCT/JP99/05466

§ 371 (c)(1),
(2), (4) Date: Jul. 26, 2000

(87) PCT Pub. No.: WO00/21248

PCT Pub. Date: Apr. 13, 2000

(30) Foreign Application Priority Data

Oct. 5, 1998 (JP) .......................................... 10-282423

(51) Int. Cl.⁷ ................................................ H04L 12/56
(52) U.S. Cl. ....................................................... 370/426
(58) Field of Search ................................ 370/394, 392, 370/410, 426, 522, 527, 528, 529, 236, 230

(56) References Cited

U.S. PATENT DOCUMENTS

| | | | | |
|---|---|---|---|---|
| 4,926,415 | A | * | 5/1990 | Tawara et al. |
| 5,535,208 | A | * | 7/1996 | Kawakami et al. |
| 5,956,341 | A | * | 9/1999 | Galand et al. |
| 6,038,607 | A | * | 3/2000 | Hamilton et al. |
| 6,226,687 | B1 | * | 5/2001 | Harriman et al. |

FOREIGN PATENT DOCUMENTS

| | | |
|---|---|---|
| EP | 0461674 | 12/1991 |
| JP | 1-295544 | 11/1989 |
| JP | 6-326718 | 11/1994 |
| JP | 11355357 | 12/1999 |

OTHER PUBLICATIONS

English Language Abstract of JP 11–355357.
English Language Abstract of JP 6–326718.
English Language Abstract of JP 1–295544.
"Proposal to the 1394 Trade Association: AV/C Compatible Asynchronous Serial Bus Connections", Draft 1.11, Sep. 1, 1998.
PWG–C/SWG–2 Proposal to the 1394 Trade Association AV WG: Part 2: AV/C Management of Asynchronous Serial Bus Connections, Sep. 21, 1998.

* cited by examiner

Primary Examiner—Kwang Bin Yao
(74) Attorney, Agent, or Firm—Greenblum & Bernstein, P.L.C.

(57) ABSTRACT

In a bus system in which a node identifier is allocated to each node, when a data file is transmitted from a transmission node 1 to a reception node 2, a control node 3 issues, to the node 1, a command including an identifier of the node 2 and a field value representing a number of data files to be transmitted to execute the data transfer, and in the case where the number of the data files is 1 or more, after the transmission of the data files of the number specified in the field is completed, the node 1 directs the node 2 to complete the transfer to thereby complete the data transfer, and in the case where the field value is 0, the transmission of the data files is continued, and thus an automatic disconnection mainly led by the data transmission node is adopted after the data transmission, which reduces issuance of commands to the minimum, attaining a high efficiency in processing.

10 Claims, 9 Drawing Sheets

(UNIT : BIT)

(UNIT : BIT)

DATA TRANSFER METHOD AND DATA TRANSFER SYSTEM

TECHNICAL FIELD

The present invention relates to a data transfer method and data transfer system used when data which does not necessitate real time processing such as still image data, document data and the like is transferred between a plurality of apparatuses.

BACKGROUND ART

Apparatuses which deal with a still image such as a digital still camera or a printer have been more widely and more increasingly marketed in recent years. These apparatuses are conventionally used in an environment in which a personal computer is present. However, needs for easy handling of such apparatuses in an environment in which a personal computer is not present, is increasing recently.

Conventionally, as a data transfer method when data which does not necessitate real time processing and which is represented by the aforementioned still-image data and document data is transmitted/received between a plurality of apparatuses, a data transfer method in which a control node commands a transmission node and a reception node respectively to control starting/completion of data transfer is proposed in AV/C Compatible Asynchronous Serial Bus Connections, Draft 1.11, Sep. 1, 1998, and "AV/C Management of Asynchronous Serial Bus Connections, Sep. 21, 1998, in 1394 Trade Association. These method use IEEE Std 1394-1995, Standard for a High Performance Serial Bus, which will be referred to as "IEEE 1394-1995" hereinafter, as a bus system, and proposes an asynchronous data transfer method in a form of extending the conventional data transfer control method for transferring/receiving data which necessitates real time processing. According to this data transfer method, when asynchronous data is transferred from a first node to a second node on a bus system in which a node identifier is allocated to each node, a control node sends a command for transfer to the first node and the second node respectively, to thereby improve the command/data processing efficiency.

FIG. 15 is a block diagram which shows a structure of a still image data transfer system using a conventional data transfer method. In FIG. 15, 101 is a data transmission node (a first node) as a device for transmitting an image such as a digital still camera, 102 is a data reception node (a second node) as a device for receiving an image such as a printer, and 103 is a control node such as a personal computer or a set top box, and these devices are connected to the same bus system 100 (IEEE 1394-1995).

FIG. 16 is a system block diagram which describes the operation of transferring data from the data transmission node 101 to the data reception node 102 under the control of the control node 103 in the conventional data transfer method.

Here, an arrow mark 104 represents a data reception command which the control node 103 issues to the data reception node 102, and an arrow mark 106 represents a data transmission command which the control node 103 issues to the data transmission node 101. An arrow mark 105 is a data reception command response by which the data reception node 102 reports the execution result of the data reception command 104 to the control node 103, and an arrow mark 107 is a data transmission command response by which the data transmission node 101 reports the execution result of the data transmission command 105 to the control node 103.

The data transmission node 101 and the data reception node 102 receive the data transmission command 106 and the data reception command 104 issued from the control node 103, respectively, and by each notifying the execution result to the control node 103, establish the connection and start the transmission of data. Herein, 108 represents data which is transferred from the data transmission node 101 to the data reception node 102.

FIG. 17 is a block diagram which describes the operation of completing the transfer of data from the data transmission node 101 to the data reception node 102 under the control of the control node 103 in the conventional data transfer method.

Here, an arrow mark 109 represents a data reception completion command which the control node 103 issues to the data reception node 102, and an arrow mark 111 represents a data transmission completion command which the control node 103 issues to the data transmission node 101. An arrow mark 110 is a data reception completion command response by which the data reception node 102 reports the execution result of the data reception command 104 to the control node 103, and an arrow mark 112 is a data transmission completion command response by which the data transmission node 101 reports the execution result of the data transmission command 106 to the control node 103. Here, an arrow mark 108 represents data which is transferred from the data transmission node 101 to the data reception node 102.

The data transmission node 101 and the data reception node 102 receive the data transmission completion command 111 and the data reception completion command 109 issued from the control node 103, respectively, and by each notifying the execution result to the control node 103, complete the transfer of data and are disconnected.

However, in the conventional data transfer method above described, the connection between the data transmission node 101 and the data reception node 102 is not disconnected unless the control node 103 gives such a completion command. Therefore, even when the control node 103 has already determined the sheet number of still image to be transmitted, the control node 103 must follow steps of periodically giving commands for asking the situation to the data transmission node 101 or the data reception node 102, and of receiving command responses to the commands, in order to recognize the completion of data transfer which is currently being carried out and command the disconnection thereof. Due to this, an extra command needs to be issued in order to detect completion of the transfer and a command for directing disconnection from the control node 103 is also required, resulting in a poor processing efficiency.

As described above, when a system in which still image data is transferred using the conventional data transfer method is considered, there exists a problem that timing at which data transfer is to be terminated and disconnected is not easily known.

Further, there exists another problem that, as disconnection process is always carried out under the control of the control node, a number of commands has to be issued, resulting in a poor processing efficiency.

The present invention intends to solve these problems and a first object of the present invention is to provide a data transfer system and method thereof in which the automatic disconnection after data transfer directed by the data transmission node or the data reception node is achieved compatible with the conventional disconnection method directed by the control node, whereby the number of commands to be issued is curbed at the minimum, and thus the processing efficiency can be improved.

In addition, a second object of the present invention is to provide a data transfer system and method thereof in which control process can be simplified in a data transfer which is carried out continuously because the completion of the data transfer is easily detected by the control node.

DISCLOSURE OF INVENTION

In order to achieve the aforementioned objects, the present invention is characterized in that, in a bus system in which a node identifier is allocated to each node, when a data file is transmitted from a transmission node to a reception node, a control node issues, to the transmission node, a command including an identifier of the reception node and a field value representing a number of data files to be transmitted to execute the data transfer, and in the case where the number of the data files is 1 or more, after the transmission of the data files of the number specified in the field is completed, the transmission node directs the reception node to complete the transfer to thereby complete the data transfer, and in the case where the field value is 0, the transmission of the data files is continued, and thus an automatic disconnection mainly led by the data transmission node or data reception node is adopted after the data transfer.

Thus, there can be obtained an improved data transfer method compatible with a conventional data transfer method, facilitating to confirm a timing of completion of data transfer, reducing issuance of commands to the minimum, attaining a high efficiency in processing.

A first aspect of the present invention provides a data transfer method of transferring at least one data file from a first node outputting a data file to a second node inputting a data file under a control of a control node in a bus system in which a node identifier is allocated to each node, said data transfer method characterized in that: the control node transmits to the first node a first command including the node identifier of the second node, and transmits to the second node a second command including the node identifier of the first node, wherein the first command includes a field which represents a specified number of data files to be transmitted by the first node, and in the case where the filed value is 1 or more, when the first node has completed the transmission of the number of the data files specified in the field, the first node directs the second node to complete the transfer to thereby complete the data transfer, and in the case where the field value is 0, the transmission of the data files is continued.

Thus, in a case in which the number of data files to be transmitted from the first node to the second node has been determined, the timing at which data transfer is to be completed is easily known and the disconnection process is automatically carried out between the transmission node and the reception node, allowing the number of commands issued on the bus at the minimum level. That is, by setting the number of the data files for transmission and reception in the command field, the issuance of the commands is reduced to the necessary minimum by the automatic disconnection mainly led by the data transmission node or data reception node, improving the efficiency in processing.

A second aspect of the present invention is characterized in that, in the case where the field value representing the number of the data files to be transmitted by the first node is 1 or more, when the first node completes the transmission of the data files of the number specified in the field and directs the second node to complete the transfer, the completion of the transfer is notified to the control node.

Thus, the control node can easily detect the completion of the data transfer, and in the case of executing the data transfer continuously, it is possible to smoothly proceed to the next data transfer. That is, after executing the automatic disconnection mainly led by the data transmission node or data reception node, by responding a second response to the control node, the control node easily to detect the completion of the data transfer, and the control process can be simplified in the continuous data transfer.

A third aspect of the present invention provides a data transfer system for transferring at least one data file from a first equipment outputting a data file to a second equipment inputting the data file in a bus system via which a plurality of equipments each having an identifier allocated thereto are connected, said data transfer system characterized by: comprising a third equipment for control which transmits to the first equipment a first command including the identifier of the second equipment, and transmits to the second equipment a second command including the identifier of the first equipment, wherein the first command includes a field which represents a specified number of data files to be transmitted by the first equipment, and the second command includes a field which represents a specified number of data files to be received by the second equipment, and in the case where the filed value representing the number of the data files to be transmitted and received is 1 or more, when the transmission and reception of the data files of the number specified in the fields is completed between the first equipment and the second equipment, the completion of the data transfer is directed to each other between the first equipment and the second equipment, whereby the data transfer is completed without intermediation of the third equipment, and in the case where the field value is 0, the transmission and reception of the data files is continued.

In this construction, the first equipment notifies the second equipment of the completion of the data transfer and the second equipment notifies the first equipment of having recognized the completion of the data transfer, whereby the connection between the equipments is automatically disconnected and the address spaces for transmission and reception of each equipment are cleared.

In this construction, in the case where the field value representing the number of the data files to be transmitted and received is 1 or more, when the transmission and reception of the data files of the number specified in the fields is completed and the completion of the transfer is directed to each other between the equipments, the first equipment or the second equipment notifies the third equipment for control of the completion of the transfer.

BEST MODE FOR CARRYING OUT THE INVENTION

Hereinafter, embodiments of the present invention will be described with reference to the drawings.
(Embodiment 1)

Figure 1:
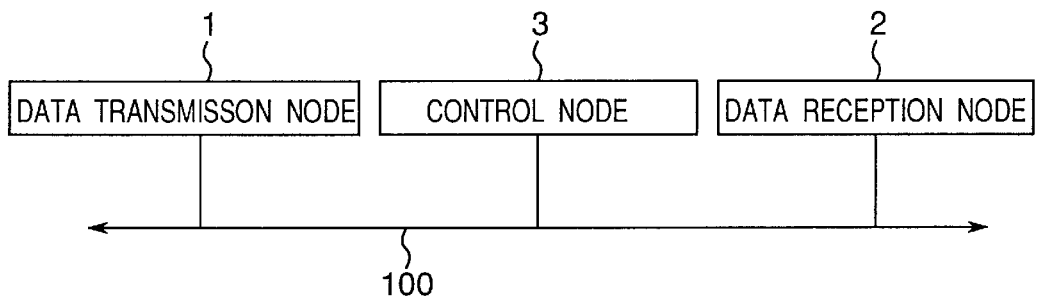
FIG. 1 is a block diagram of a system using a data transfer method according to a first embodiment of the present invention.

FIG. 1 is a block diagram of a system of a data transfer method according to a first embodiment of the present invention. In FIG. 1, 1 is a data transmission node (a first node) which is a device for transmitting an image such as a digital still camera, 2 is a data reception node (a second node) which is a device for receiving an image such as a printer, and 3 is a control node such as a personal computer or a set-top box, and these devices are connected to the same bus system 100.

In the present embodiment, IEEE 1394-1995 is used as a bus system and a case in which data transfer is carried out between the devices connected to the bus will be exemplarily described. As for each command and each response corresponding to each command, transmission of commands and responses is carried out using Function Control Protocol (referred to as "FCP" hereinafter) defined in IEC-61883, Proposed standard for Digital Interface for Consumer Electronic Auto/Video Equipment, and each command and each response are carried out in accordance with the regulations of AV/C Digital Interface Command Set (referred to as "AV/C Command" hereinafter).

Figure 2:
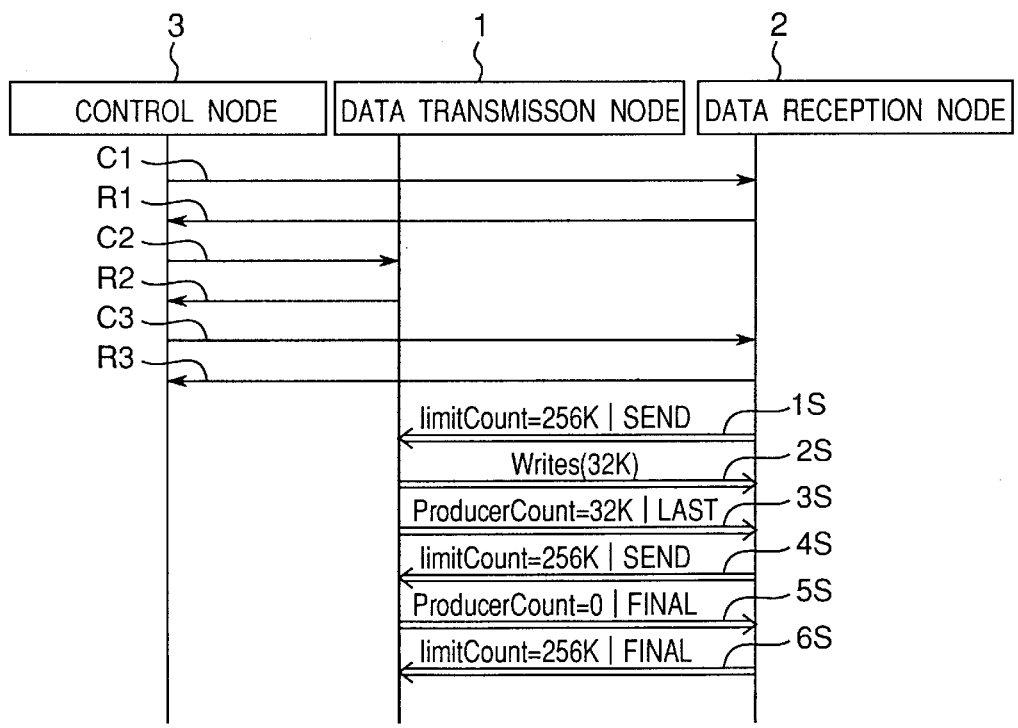
FIG. 2 is a block diagram representing the operation of the system using the same data transfer method.

FIG. 2 is a system block diagram describing the operation of the present embodiment. Here, data to be transferred from the data transmission node 1 to the data reception node 2 is one still image data having 32 kilobytes. In the present embodiment, although the reception buffer size is a fixed value of 256 K in rewriting oAPR from the reception node, other values may be used as the reception buffer size.

C1 is an Allocate Command which is issued to the data reception node 2 by the control node 3, R1 is an Allocate Command Response by which the data reception node 2 reports the execution result of the Allocate Command C1 to the control node 3, C2 is an Allocate_Attach Command which is issued by the control node 3 to the data transmission node 1, R2 is an Allocate_Attach Command Response by which the data transmission node 1 reports the execution result of the Allocate_Attach Command C2 to the control node 3, C3 is an Attach Command which is issued by the control node 3 to the data reception node 2, and R3 is an Attach Command Response by which the data reception node 2 reports the execution result of the Attach Command C3 to the control node 3. Here, ALLOCATE_ATTACH may be also described as ALLOCATE_CONNECT, and ATTACH may be occasionally described as CONNECT.

Figure 3:
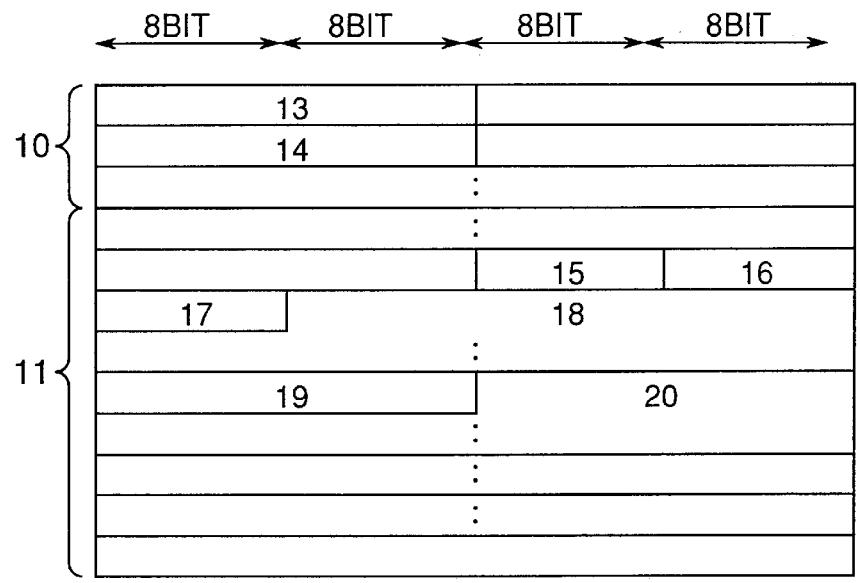
FIG. 3 is a diagram showing a data format of each command and each command response according to the same data transfer method.

FIG. 3 shows a data format of the Allocate Command C1/Allocate Command Response R1, Allocate_Attach Command C2/Allocate_Attach Command Response R2, and Attach Command C3/Attach Command Response R3. In FIG. 3, 10 is a packet header portion, 11 is a FCP frame portion (or a data block portion), and these packet header portion 10 and FCP frame portion 11 constitute an asynchronous write packet defined in IEEE 1394-1995. Further, 13 is a 16-bit identifier of the destination node to which the packet is transmitted, and 14 is an identifier of the source node from which the packet is transmitted. These node identifiers are also defined in IEEE 1394-1995.

In the AV/C command, data of the commands C1, C2 and C3 to the nodes or of the command responses R1, R2 and R3 are included in the FCP frame portion 11. Here, each command and each command response share the same data format, and the data reception node 2 receives a command and executes a process, and after rewriting according to necessity the specified field value of the command which the data reception node 2 has received before, a process of transferring this packet as a command response to the control node 3 is carried out.

Here, 15 is a command field, 16 is a sub function field, 17 is a data file number field, 18 is a register address of the connection source node (which is represented as "plug offset"), 19 is a node identifier of the connection destination, 20 is a register address of the connection destination node (which is represented as "connected plug offset"). In a connection for transferring asynchronous data, connection for asynchronous data transfer is specified in the command field 15 and each command is specified in the sub function field 16.

First, the control node 3 issues to the data reception node 2 the Allocate Command C1 having a packet format shown in FIG. 3. Each data field value of a packet which is issued here is shown in (Table 1).

TABLE 1

ALLOCATE COMMAND C1

| Data Field | Value |
| --- | --- |
| Node Identifier of Destination to which Packet is transmitted | Node Identifier of Data Reception Node 2 |
| Node Identifier of Source from which Packet is transmitted | Node Identifier of Control Node 3 |
| Asynchronous Connection Command Code | Direction that Connection is for Transfer of Asynchronous Data |
| Sub Function Field | ALLOCATE |
| Data File Number Field | 0 |

TABLE 1-continued

ALLOCATE COMMAND C1

| Data Field | Value |
|---|---|
| Register Address of Connection Source Node | Unknown (Buried with 0xFF) |
| Connection Destination Node Identifier | Unknown (Buried with FF (16)) |
| Register Address of Connection Destination Node | Unknown (Buried with 0xFF) |

The Allocate Command C1 is issued by the control node 3 to direct the data reception node 2 to secure address space for data reception. The Allocate Command Response R1 is a command response according to which, a data field of the pre-received Allocate Command C1 which was able to secure address space for data reception is subject to rewriting of the register address 18 of the connection source node from the current "Unknown" to the above-mentioned secured address of the reception node 2, and the Allocate Command Response R1 is transferred to the control node 3 as a command response R1 for processing, while a data field of the pre-received Allocate Command C1 which was not able to secure address space for data reception is transferred to the control node 3 for processing without being subject to rewriting of the register address 18 of the connection source node as is left "Unknown". Here, 0xFF indicates that the address value is unknown, where 0x represents a hexadecimal and FF represents a symbol code indicating that "1" is established for all digits.

When the register address 18 of the connection source node of the received Allocate Command Response R1 has been rewritten, namely, in the case where the address space for data reception can be secured in the data reception node 2, the control node 3 issues to the data transmission node 1 the Allocate_Attach Command C2 having the packet format of FIG. 3. Each data field value of the packet issued here is shown in (Table 2). In the Allocate_Attach Command C2, the number of data files to be transmitted is set in the data file number field 17.

As shown in Table 2, the Allocate_Attach Command C2 is a command by which the control node 3 notifies the data transmission node 1 of the address space number for reception which has been secured by the data reception node 2 as a value of the register address (20) of the connection destination node of the Allocate_Attach Command C2 and notifies of the number of data file to be transmitted to the data reception node 2 (=1) and directs the data transmission node 1 to secure the address space (18) for data transmission. The Allocate_Attach Command Response R2 is a command response according to which, a data field of the pre-received Allocate_Attach Command C2 which was able to secure address space for data transmission is subject to rewriting of the register address 18 of the connection source node from Unknown to a concrete address number and transferred to the control node 3 as a command response R2 for processing, while in the case where address space can not be secured, the command response is transferred to the control node 3 for processing as the command response R2 without being subject to rewriting of the register address 18 of the connection source node.

Next, when the register address 18 of the connection source node of the received Allocate_Attach Command Response R2 has been rewritten, the control node 3 sends to the data reception node 2 the Attach Command C3 having the packet format of FIG. 3. Each data field value of the packet issued here is shown in (Table 3).

The Attach Command C3 is issued by the control node 3 to direct the data reception node 2 to notify of the address space for transmission which has been secured by the data transmission node 1 as the value of the register address (20) of the connection destination node of Table 3 and directs to start data transfer. The data reception node 2 transfers the pre-received Attach Command C3 shown in Table 3 left as it is as a command response R3 to the control node 3 and then data transfer between the data transmission node 1 and the data reception node 2 is started.

TABLE 2

ALLOCATE_ATTACH COMMAND C2

| Data Field | Value |
|---|---|
| Node Identifier of Destination to which Packet is transmitted | Node Identifier of Data Transmission Node 1 |
| Node Identifier of Source from which Packet is transmitted | Node Identifier of Control Node 3 |
| Asynchronous Connection Command Code | Direction that Connection is for Transfer of Asynchronous Data |
| Sub Function Field | ALLOCATE_ATTACH |
| Data File Number Field | Number of Data Files to be transmitted (=1) |
| Register Address of Connection Source Node | Unknown (Buried with 0xFF) |
| Connection Destination Node Identifier | Node Identifier of Data Reception Node 2 |
| Register Address of Connection Destination Node | Register Address of Data Reception Node 2 |

Figure 4:
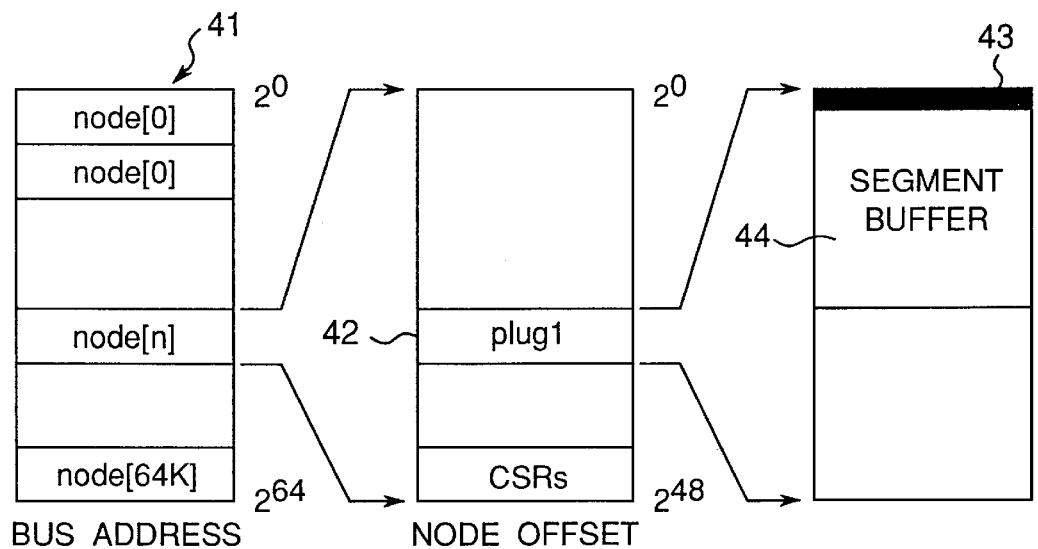
FIG. 4 is a stair layer diagram showing a relationship of an offset construction of each node.
Figure 5:
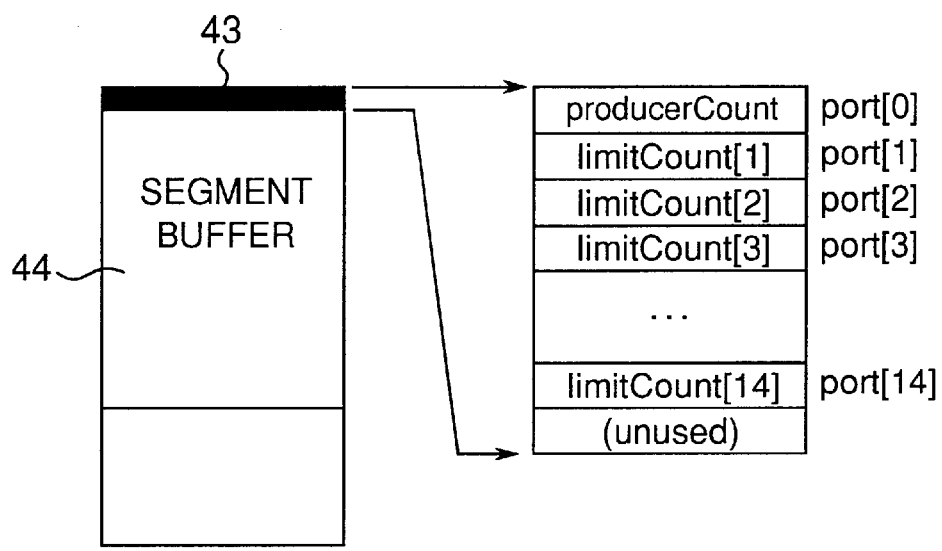
FIG. 5 is a constitution diagram showing a mapping arrangement of each plug register.

Here, in a data transfer process between the data transmission node 1 and the data reception node 2 as shown in the latter half of FIG. 2, "LimitCount" refers to steps 1S, 4S and 6S is described as "oAPR" in the newest Standard which represents a register for controlling transmission in the data transmission node 1, and "ProducerCount" refers to steps 3S and 5S is described as "iAPR" in the newest Standard which indicates a register for controlling reception in the data reception node 2. The relationships of the register mapping construction of each of these nodes are shown in FIGS. 4 and 5.

TABLE 3

ATTACH COMMAND C3

| Data Field | Value |
|---|---|
| Node Identifier of Destination to which Packet is transmitted | Node Identifier of Data Reception Node 2 |
| Node Identifier of Source from which Packet is transmitted | Node Identifier of Control Node 3 |
| Asynchronous Connection Command Code | Direction that Connection is for Transfer of Asynchronous Data |
| Sub Function Field | ATTACH |
| Data File Number Field | 0 |
| Register Address of Connection Source Node | Register Address of Data Reception Node 2 |
| Connection Destination Node Identifier | Node Identifier of Data Transmission Node 1 |

TABLE 3-continued

ATTACH COMMAND C3

| Data Field | Value |
| --- | --- |
| Register Address of Connection Destination Node | Register Address of Data Transmission Node 1 |

As shown in FIG. 4, in the IEEE1394-1995, an address of 64 bits in width is used among which lower significant 48 bits represents an address space, 41 for use within the device. An asynchronous plug register 42 is installed in the memory space and may includes a port register 43 and segment buffer address portion 44.

In FIG. 5, the asynchronous plug register 42 may hold 15 ports which are arranged in the order of iAPR, oAPR(1), oAPR(2), . . . , oAPR(14). That is, the transmission node 1 includes a plug register comprised of at least one oAPR1 each comprised of 32 bits, and similarly the reception node 2 includes a plug register comprised of one iAPR1 and buffer each comprised of 32 bits. Here, the number of the ports actually included in each plug register depends on the equipment.

Figure 6:
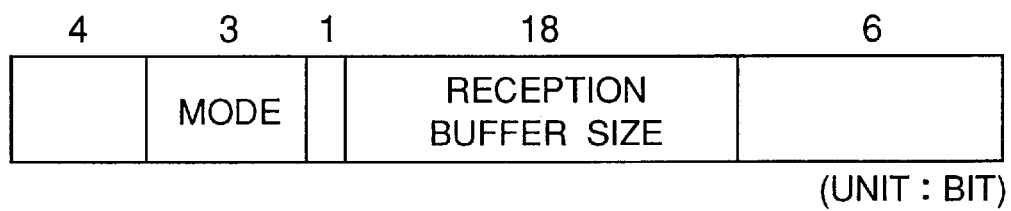
FIG. 6 is a diagram showing a format of a limitCount register according to the same data transfer method.
Figure 7:
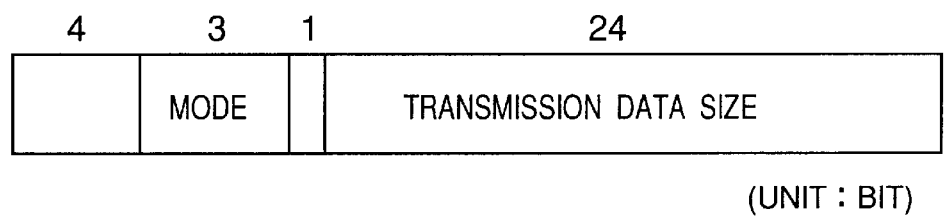
FIG. 7 is a diagram showing a format of a producerCount register according to the same data transfer method.

The format of the oAPR register shown by "limitcount" mentioned above is shown in FIG. 6, and the format of the iAPR register shown by "ProducerCount" is shown in FIG. 7 in a unit of bits. These are constructed by formats each comprised of 32 bits. Among the modes which are specified in the mode field (3 bit) in the format and used for flow control, main ones are shown in (Table 4).

However, although the mode value FREE is used in the sense of "Transmission and Reception of all files being completed" (FINAL) in Table 4, the mode value FREE is used in the sense of setting "Initial condition" and "starting of disconnection" in the latest Standard.

TABLE 4

| Symbol | Meaning |
| --- | --- |
| FROM TRANSMISSION NODE TO RECEPTION NODE | |
| FREE (FINAL) | COMPLETION OF TRANSMISSION OF ALL DATA FILES |
| MORE | HALFWAY OF DATA FILE |
| SUSPENDED | RECOGNIZATION OF SUSPENSION OF DATA TRANSFER |
| LAST | COMPLETION OF TRANSMISSION OF CURRENT DATA FILE |
| LESS | TRANSMISSION DATA NUMBER WAS LESS |
| JUNK | INVALID DATA WAS TRANSMITTED |
| LOST | NO DATA WAS TRANSMITTED |
| FROM RECEPTION NODE TO TRANSMISSION NODE | |
| FREE (FINAL) | COMPLETION OF RECEPTION OF ALL DATA FILES |
| SUSPENDED | SUSPENSION OF DATA TRANSFER |
| RESUME | RESUMPTION OF DATA TRANSFER |
| SEND | RECEPTION OF DATA IS POSSIBLE |
| TOSS | SUBSEQUENT DATA IS NOT NEEDED |

In FIG. 2, rewriting into the transmission side oAPR register is described in a form of oAPR=(Reception Buffer Size)|(Mode). In addition, rewriting into the reception side iAPR register is described in a form of iAPR=(Transmission Data Size)|(Mode). Rewriting into the oAPR register and iAPR register is carried out by the 4-byte Compare_Swap Lock Transaction of IEEE 1394-1995.

In the data transfer process between the data transmission node 1 and the data reception node 2 shown in FIG. 2, first, the data reception node 2 notifies the data transmission node 1 of the capacity of the buffer (assumed as 256 kilobytes here) which is capable of data reception (Step 1S). The data transmission node 1 transfers a data of 32 kilobytes to the data reception node 2, using IEEE 1394-1995 asynchronous write packet (Step 2S). When completing transmission of the file of 32 kilobyte, the data transmission node 1 notifies the data reception node 2 of having completed transmission of the current data file successfully (Step 3S). The data reception node 2 notifies the data transmission node 1 that reception of the next data file is possible (Step 4S). The data transmission node 1 notifies the data reception node 2 of the completion of data transfer (step 5S). The data reception node 2 notifies the data transmission node 1 of its having recognized the completion of data transfer (Step 6S). Then, the connection between the data transmission node 1 and the data reception node 2 is disconnected, and the data transmission node 1 releases the secured address space for transmission, and the data reception node 2 releases the secured address space for reception. That is, the address spaces oAPR and iAPR for transmission and reception of each equipment are cleared. The term "cleared" means the case of conducting only "Initialization" and including the case of conducting "Release of address space", and the determination whether only "Initialization" is executed or the "Release of address space" is also executed depends on each equipment. In the case of the equipment permanently keeping the address space for transmission and reception, only the "Initialization" is executed, but according to the equipments, there is a case of executing the "Release of address space" as well as the disconnection.

As described above, when the number of data files to be transmitted has been pre-determined, since the data transmission node 1 and the data reception node 2 can carry out disconnection without intermediation of the control node 3, disconnection is carried out simultaneous with the completion of data transfer and the number of commands issued on the bus is reduced. Further, the control by the control node 3 can be simplified.

(Embodiment 2)

Figure 8:
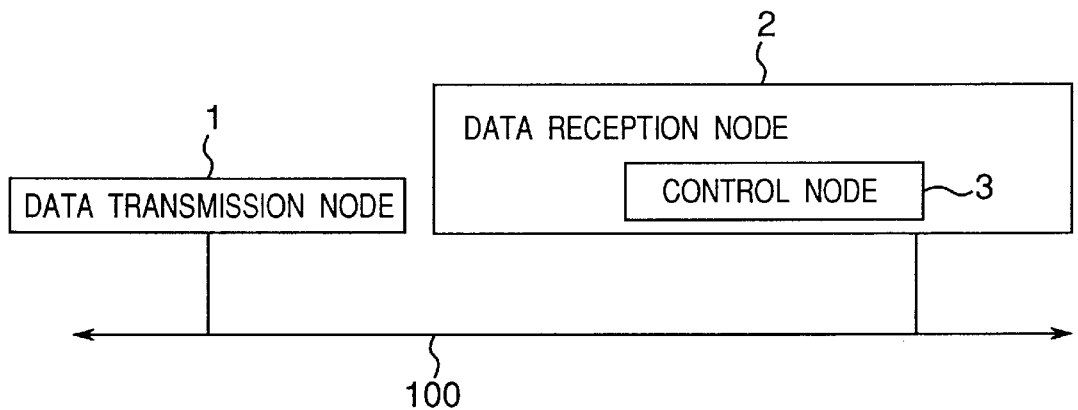
FIG. 8 is a block diagram of a system using a data transfer method according to a second embodiment of the present invention.

Next, a second embodiment of the present invention will be described. FIG. 8 is a block diagram of a system of a data transfer method according to the present embodiment. As the present embodiment is basically the same as the first embodiment shown in FIG. 2, detailed description of the system components and the operation thereof will be omitted here.

The present embodiment shown in FIG. 8 is different from the first embodiment described above in that the control node 3 is included in the data reception node 2.

In the structure shown in FIG. 8, the Allocate Command C1, the Allocate Command Response R1, the Attach Command C3, the Attach Command Response R3 shown in FIG. 2 are processed internally and therefore the packet data of these commands/responses are not transmitted on the bus.

On the other hand, the Allocate_Attach Command C2 issued to the data transmission node 1 and the Allocate Attach Command Response R2 have the very same format as the packet format of the first embodiment described in FIG. 3. Herein, the present embodiment differs from the first embodiment only in that the value of the node identifier 14 of the source from which the packet is transmitted is equal to the value of the connection destination node identifier 19 in the ALLOCATE_ATTACH COMMAND C2.

Except for this point, as far as the operation of the present embodiment and the control method of the data transmission node 1 are concerned, the data transfer process can be carried out according to the very same process as in the first embodiment described above.

In short, by comparing the first embodiment of the present invention with the second embodiment thereof, it is understood that a system can be established which is capable of flexibly adapting to various system constructions and achieves an excellent processing efficiency under the control of the control node 3.

(Embodiment 3)

Figure 9:
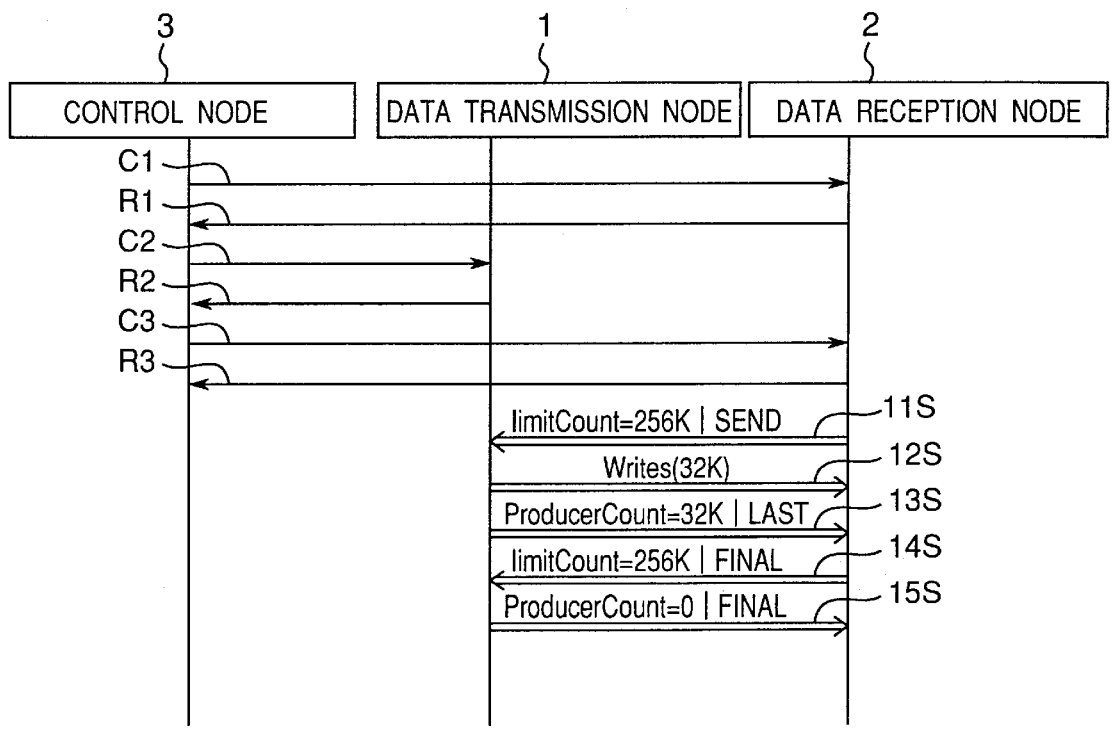
FIG. 9 is a block diagram representing the operation of a system using a data transfer method according to a third embodiment of the present invention.

Next, a third embodiment of the present invention will be described. FIG. 9 is a system block diagram describing the operation of the present embodiment. Herein, data which is transferred from the data transmission node 1 to the data reception node 2 is one still image data having 32 kilobytes. As some operations of the present embodiment are the same as those in the first embodiment shown in FIG. 2, detailed description of such operations will be omitted.

The third embodiment shown in FIG. 9 differs from the first embodiment described above in the point of the value of the data file number field 17 which is one of the data fields of the Allocate__Attach Command C2 and Attach Command C3 having the packet format of the first embodiment described in FIG. 3 and in the point of the procedure after the data transfer is started. As the value of each data field of the Allocate Command C1 is the same as that in the first embodiment, description thereof will be omitted. The value of each data field of the Allocate__Attach Command C2 is shown in (Table 5) and the value of each data field of the Attach Command C3 is shown in (Table 6).

TABLE 5

| ALLOCATE__ATTACH COMMAND C2 | |
| --- | --- |
| Data Field | Value |
| Node Identifier of Destination to which Packet is transmitted | Node Identifier of Data Data Transmission Node 1 |
| Node Identifier of Source from which Packet is transmitted | Node Identifier of Control Node 3 |
| Asynchronous Connection Command Code | Direction that Connection is for Transfer of Asynchronous Data |
| Sub Function Field | Allocate__Attach |
| Data File Number Field | 0 |
| Register Address of Connection Source Node | Unknown (Buried with 0xFF) |
| Connection Destination Node Identifier | Node Identifier of Data Reception Node 2 |
| Register Address of Connection Destination Node | Register Address of Data Reception Node 2 |

TABLE 6

| ATTACH COMMAND C3 | |
| --- | --- |
| Data Field | Value |
| Node Identifier of Destination to which Packet is transmitted | Node Identifier of Data Reception Node 2 |
| Node Identifier of Source from which Packet is transmitted | Node Identifier of Control Node 3 |
| Asynchronous Connection Command Code | Direction that Connection is for Transfer of Asynchronous Data |
| Sub Function Field | Attach |

TABLE 6-continued

| ATTACH COMMAND C3 | |
| --- | --- |
| Data Field | Value |
| Data File Number Field | Number of Data Files to be transmitted (=1) |
| Register Address of Connection Source Node | Register Address of Data Reception Node 2 |
| Connection Destination Node Identifier | Node Identifier of Data Transmission Node 1 |
| Register Address of Connection Destination Node | Register Address of Data Transmission Node 1 |

Hereinafter, the operation of the present embodiment will be described with reference to FIG. 9.

First, the data reception node 2 notifies the data transmission node 1 of the capacity of the buffer (assumed as 256 kilobytes here) which is capable of data reception (Step. 11S). The data transmission node 1 transfers a data to the data transmission node 2, using IEEE 1394-1995 asynchronous write packet (Step 12S). When completing transmission of the file of 32 kilobytes, the data transmission node 1 notifies the data reception node 2 of having completed transmission of the current data file successfully (Step 13S). The data reception node 2 notifies the data transmission node 1 of the completion of data transfer (Step 14S). The data transmission node 1 notifies the data reception node 2 of its having recognized the completion of data transfer (Step 15S). Then, the connection between the data transmission node 1 and the data reception node 2 is disconnected, and the data transmission node 1 releases the secured address space for transmission, and the data reception node 2 releases the secured address space for reception.

As described above, similarly to the first embodiment, when the number of data files to be transmitted has been pre-determined, since the data transmission node 1 and the data reception node 2 can carry out disconnection without intermediation of the control node 3, disconnection is carried out simultaneous with the completion of data transfer and the number of commands issued on the bus is reduced. Further, the control by the control node 3 can be simplified.

(Embodiment 4)

Figure 10:
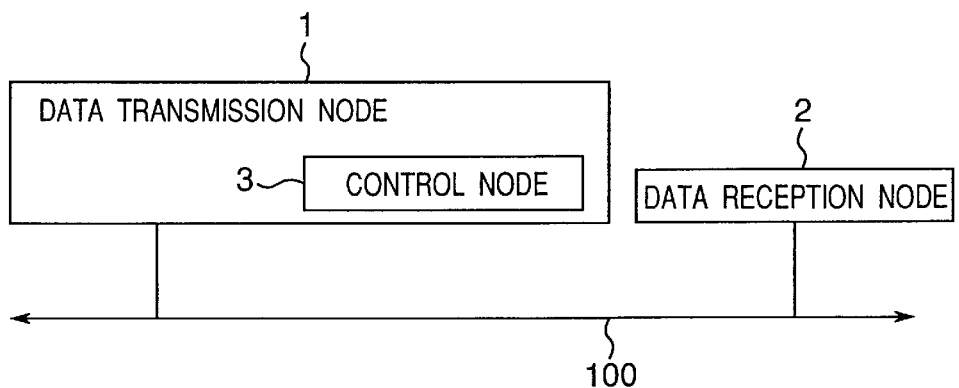
FIG. 10 is a block diagram of a system using a data transfer method according to a fourth embodiment of the present invention.

Next, a fourth embodiment of the present invention will be herein described. FIG. 10 is a block diagram of a system of a data transfer method according to the present embodiment. As the present embodiment is basically the same as the third embodiment shown in FIG. 9, detailed description of the system components and the operation thereof will be omitted here.

The fourth embodiment shown in FIG. 10 is different from the third embodiment described above in that the control node 3 is included in the data transmission node 1. In FIG. 10, the Allocate__Attach Command C2 and the Allocate__Attach Command Response R2 shown in FIG. 9 are processed internally and therefore the packet data of these commands/responses are not transmitted on the bus.

On the other hand, the Allocate Command C1 issued to the data reception node 2, the Allocate Command Response R1, the Attach Command C3, and the Attach Command Response R3 have the very same format as the packet format of the third embodiment described in FIG. 9. Herein, the present embodiment differs from the third embodiment only in that the value of the node identifier 14 of source from which the packet is transmitted is equal to the value of the connection destination node identifier 19 in the Allocate Command C1 and the Attach Command C3.

Except for this point, as far as the operation of the present embodiment and the control method of the data reception node 2 are concerned, the data transfer process can be carried out according to the very same process as in the third embodiment described above.

In short, by comparing the third embodiment of the present invention with the fourth embodiment thereof, it is understood that a system can be established which is capable of flexibly adapting to various system constructions and achieves an excellent processing efficiency under the control of the control node 3.

(Embodiment 5)

Figure 11:
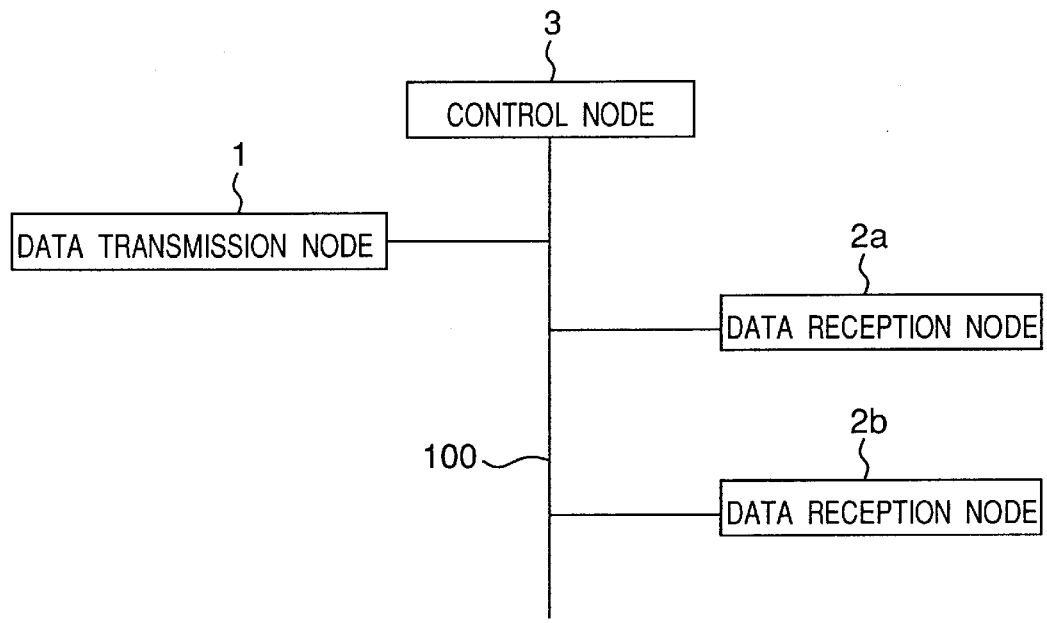
FIG. 11 is a block diagram of a system using a data transfer method according to a fifth embodiment of the present invention.

Next, a fifth embodiment of the present invention will be described. FIG. 11 is a block diagram of a system of the present embodiment. In FIG. 11, 1 is a data transmission node (a first node) which is an equipment for transmitting image such as a digital still camera, 2a and 2b are data reception nodes (a second node and a fourth node) which are equipments for receiving image such as printers. 3 is a control node such as a personal computer or a set-top box, and these equipments are connected to the same bus system 100. Here, one still image data of 32 kilobytes is transferred from the data transmission node 1 to the data reception node 2a, and one still image data of 32 kilobytes is transferred from the data transmission node 1 to the data reception node 2b.

Figure 12:
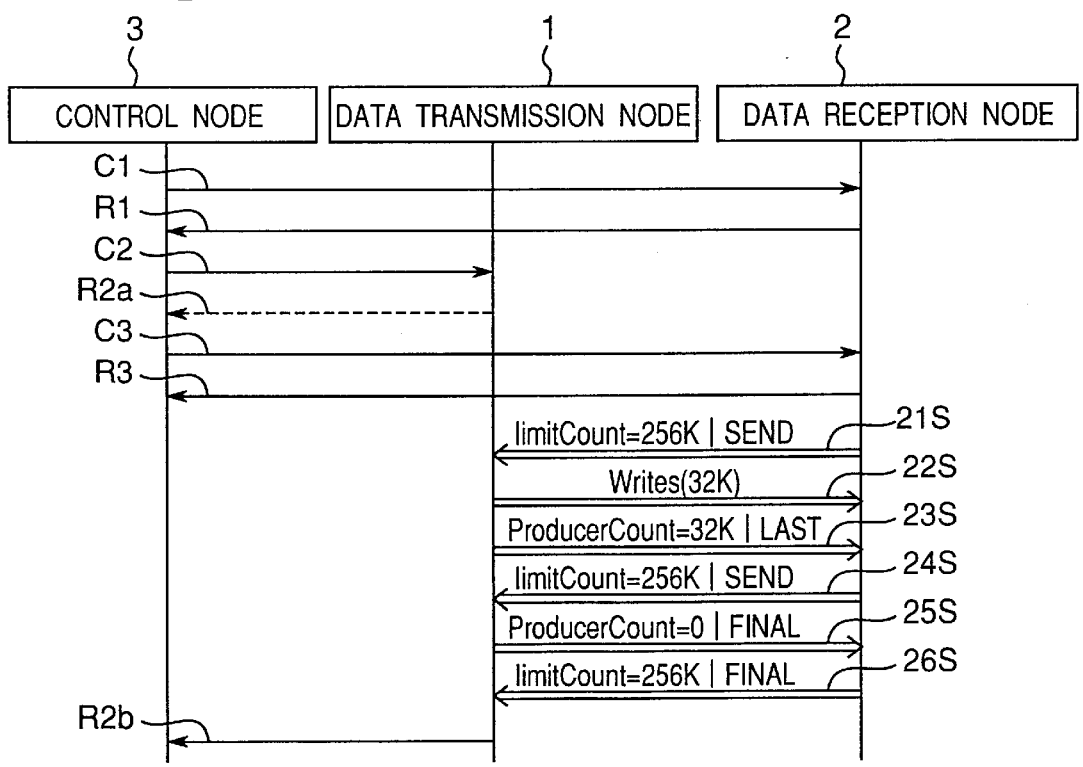
FIG. 12 is a block diagram representing the operation of the system using the same data transfer method.

FIG. 12 describes the operation of transferring data from the data transmission node 1 to the data reception node 2 in the system of the present embodiment. As some operations of the present embodiment are the same as those in the first embodiment shown in FIG. 2, detailed description of such operations will be omitted here.

Figure 13:
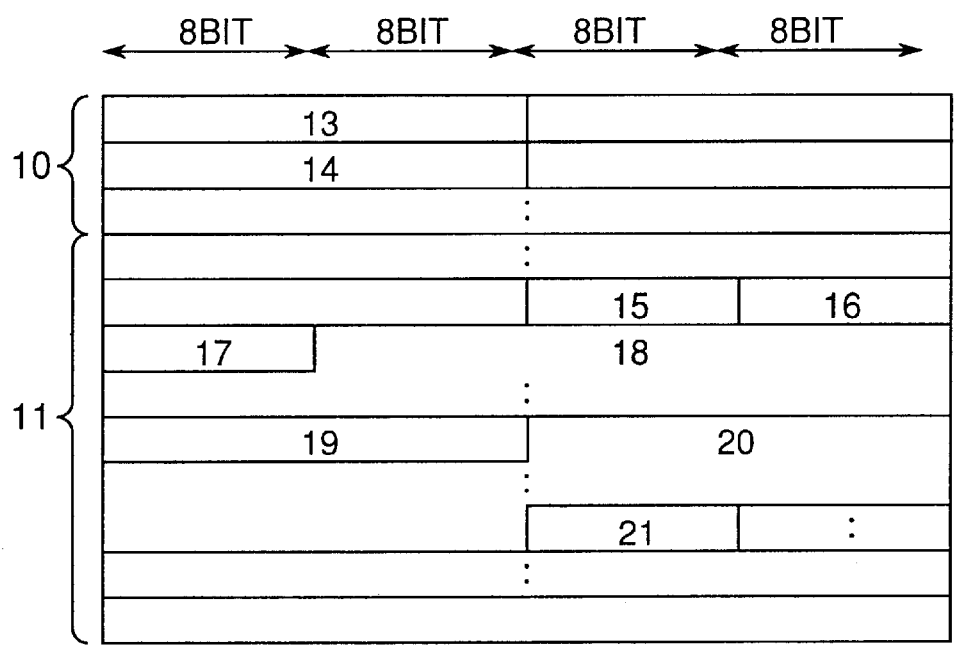
FIG. 13 is a diagram showing a data format of each command and each command response according to the same data transfer method.

In FIG. 12, C2 is an Allocate_Attach Command having the packet format of FIG. 13. As each data field of the data format shown in FIG. 13 basically shares the same packet format as in the first embodiment described in FIG. 3, description thereof will be omitted. In FIG. 13, 21 is a status field for showing the situation of the transfer. That is, the register of the transmission node includes a packet storage portion (not shown) for storing the packet of the ALLOCATE_ATTACH COMMAND C2. The values of each data field of the packet issued here are shown in (Table 7).

The Allocate_Attach Command C2 is issued by the control node 3 to notify the data transmission node 1 of the address space for reception which has been secured by the data reception node 2 and of the number of data file to be transmitted to the data reception node 2a (=1) and direct the data transmission node 1 to secure the address space for data transmission. A first Allocate_Attach Command Response R2a is for transferring the pre-received Allocate_Attach Command C2 as a command response to the control node 3 for processing, after rewriting the register address 18 of the connection source node among the data fields of the Allocate_Attach Command C2 when the address space for data transmission could be secured, or without rewriting when the address space for data transmission could not be secured. Here, the first Allocate_Attach Command Response R2a represents that which is directly transferred to the control node 3 without being subject to rewriting the status field 21.

TABLE 7

ALLOCATE_ATTACH COMMAND C2

| Data Field | Value |
|---|---|
| Node Identifier of Destination to which Packet is transmitted | Node Identifier of Data Transmission Node 1 |
| Node Identifier of Source from which Packet is transmitted | Node Identifier of Control Node 3 |
| Asynchronous Connection Command Code | Direction that Connection is for Transfer of Asynchronous Data |
| Sub Function Field | Allocate_Attach |
| Data File Number Field | Number of Data Files to be transmitted (=1) |
| Register Address of Connection Source Node | Unknown (Buried with 0xFF) |
| Connection Destination Node Identifier | Node Identifier of Data Reception Node 2 |
| Register Address of Connection Destination Node | Register Address of Data Reception Node 2 |
| Status Field | Unknown (Buried with 0xFF) |

Then, after the data transfer which is similar to that in the first embodiment is carried out, the data transmission node 1 rewrites the register address 18 and the status field 21 of the connection source node of the data filed of the pre-received Allocate_Attach Command C2 and transfers the rewritten one to the control node 3 as a second Allocate_Attach Command Response R2b, for processing. The value of each data field of the packet issued here is shown in (Table 8).

TABLE 8

SECOND ALLOCATE_ATTACH COMMAND RESPONSE R2b

| Data Field | Value |
|---|---|
| Node Identifier of Destination to which Packet is transmitted | Node Identifier of Control Node 3 |
| Node Identifier of Source from which Packet is transmitted | Node Identifier of Data Transmission Node 1 |
| Asynchronous Connection Command Code | Direction that Connection is for Transfer of Asynchronous Data |
| Sub Function Field | Allocate_Attach |
| Data File Number Field | Number of Data Files to be transmitted (=1) |
| Register Address of Connection Source Node | Register Address of Data Transmission Node 1 |
| Connection Destination Node Identifier | Node Identifier of Data Reception Node 2 |
| Register Address of Connection Destination Node | Register Address of Data Reception Node 2 |
| Status Field | Data Transfer is completed (0 = 0x00) |

The control node 3 receives the second Allocate Attach Command Response R2b from the data transmission node 1, and when the control node 3 recognizes the completion of data transfer to the first data reception node 2a, the control node 3 starts the operation of transferring data from the data transmission node 1 to the second data reception node 2b. As the operation is similar to the operation of transferring data from the data transmission node 1 to the data reception node 2 except for that the reception node is changed from the first data reception node 2a to the second data reception node 2b, detailed description thereof will be omitted.

As described above, when the number of data files to be transmitted has been pre-determined, since the data transmission node 1 and the data reception node 2 carry out disconnection, the disconnection is achieved simultaneous with the completion of data transfer and therefore the number of commands issued on the bus can be reduced. Further, since such disconnection is reported to the control node 3 as well, the control node 3 need not inquire of the state of transfer which is being carried out as a preparation for next data transfer. Therefore, the number of commands issued on the bus is further reduced and shifting to the next transfer operation can be made more smoothly.

[Embodiment 6]

Next, a sixth embodiment of the present invention will be described. As the system of the present embodiment is basically the same as that in the fifth embodiment shown in FIG. 11, detailed description of system components and the operation of thereof will be omitted. Here, one still image data of 32 kilobytes is transferred from the data transmission node 1 to the first data reception node 2*a*, and one still image data of 32 kilobytes is transferred from the data transmission node 1 to the second data reception node 2*b*.

Figure 14:
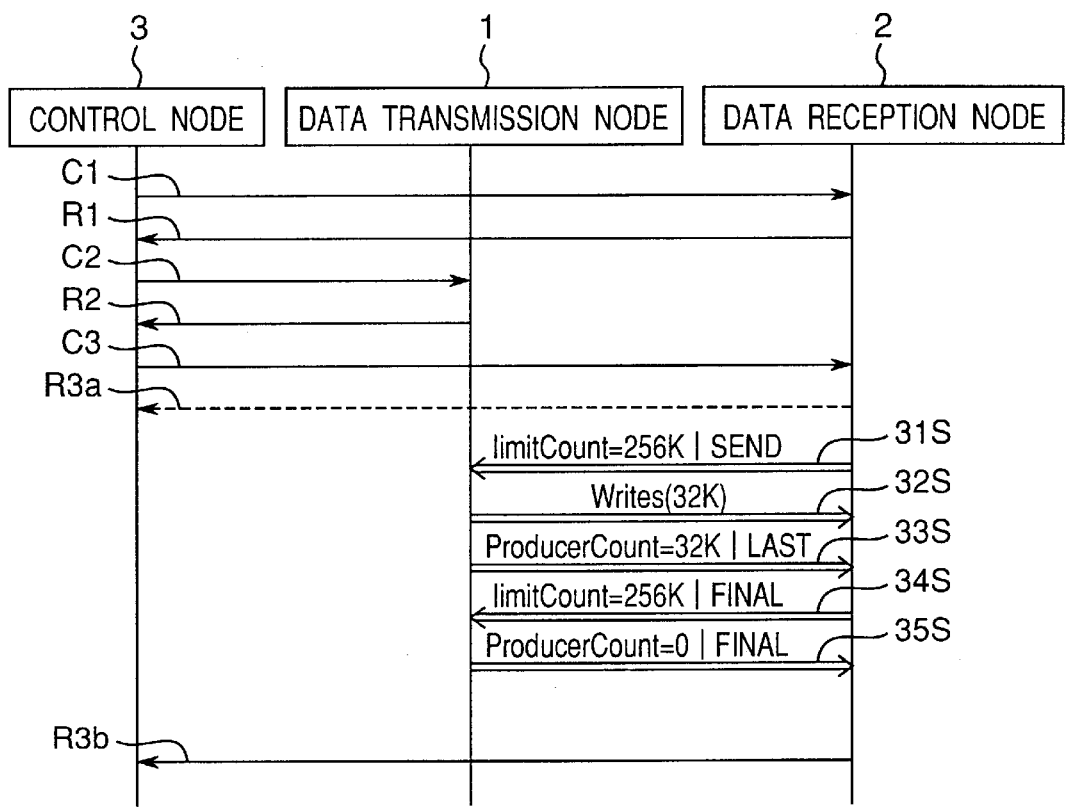
FIG. 14 is a block diagram representing the operation of a system using a data transfer method according to a sixth embodiment of the present invention.
Figure 15:
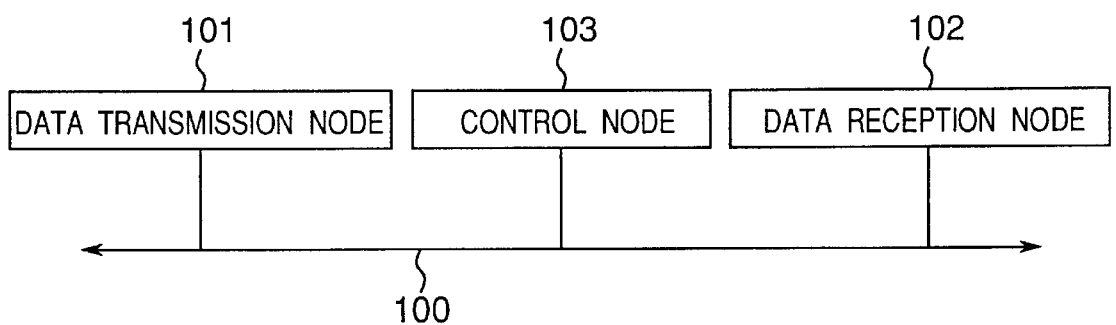
FIG. 15 is a block diagram of a system using a conventional data transfer method.
Figure 16:
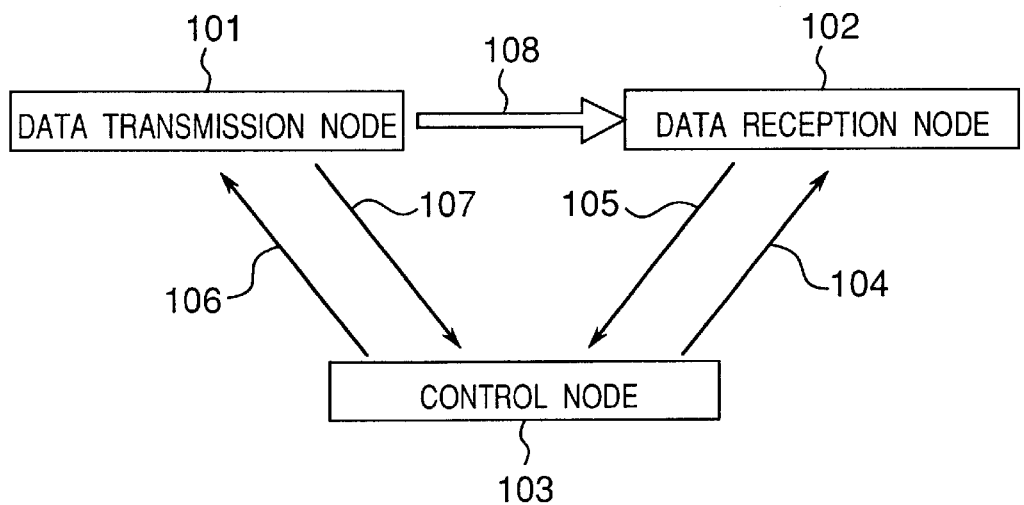
FIG. 16 is a block diagram representing the operation of when transfer is started in a still image data system according to the conventional data transfer method.
Figure 17:
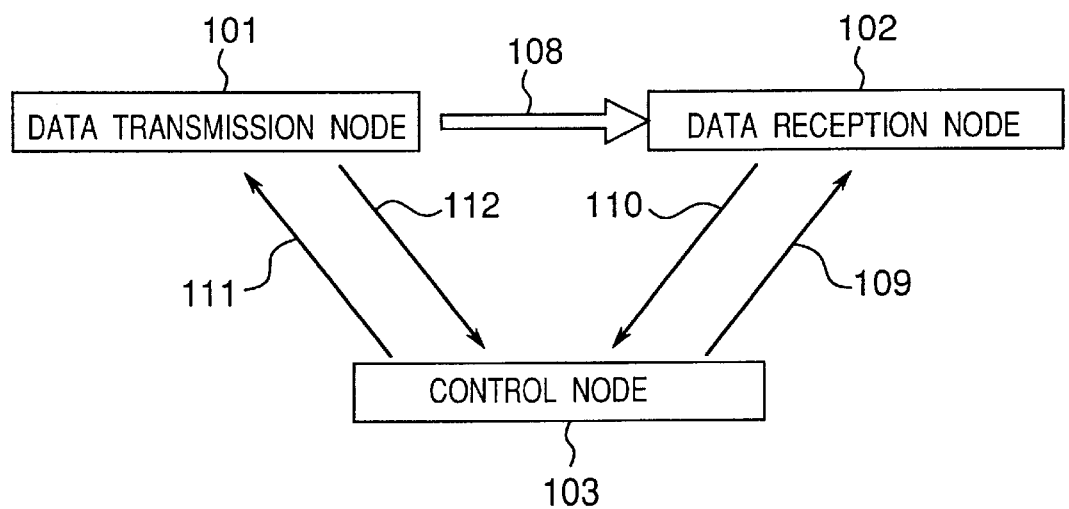
FIG. 17 is a block diagram representing the operation of when transfer is completed in a still image data system according to the conventional data transfer method.

FIG. 14 describes the operation of transferring data from the data transmission node 1 to the data reception node 2 in the system of the present embodiment. As some operations of the present embodiment are the same as those in the third embodiment shown in FIG. 9, detailed description of such operations will be omitted.

In FIG. 14, C3 is Attach Command having a packet format which is similar to that in the fifth embodiment described in FIG. 13. That is, the register of the reception node 2 includes a packet storage portion (not shown) for storing the Attach Command C3. The value of each data field of the packet issued here is shown in (Table 9).

TABLE 9

ATTACH COMMAND C3

| Data Field | Value |
| --- | --- |
| Node Identifier of Destination to which Packet is transmitted | Node Identifier of Data Reception Node 2 |
| Node Identifier of Source from which Packet is transmitted | Node Identifier of Control Node 3 |
| Asynchronous Connection Command Code | Direction that Connection is for Transfer of Asynchronous Data |
| Sub Function Field | Attach |
| Data File Number Field | Number of Data Files to be received (=1) |
| Register Address of Connection Source Node | Register Address of Data Reception Node 2 |
| Connection Destination Node Identifier | Node Identifier of Data Transmission Node 1 |
| Register Address of Connection Destination Node | Register Address of Data Transmission Node 1 |
| Status Field | Unknown (Buried with OxFF) |

The Attach Command C3 is issued by the control node 3 to direct the data reception node 2 to notify of the address space for transmission which has been secured by the data transmission node 1 and start data transfer. The data reception node 2 transfers the pre-received Attach Command C3 as it is as a command response (a first Attach Command Response R3*a*) to the control node 3 and then data transfer between the data transmission node 1 and the data reception node 2 is started. Here, the first Attach Command Response R3*a* is transferred to the control node 3 as it is without having its data field rewritten.

After the data transfer similar to that of the third embodiment is carried out, the data reception node 2 rewrites the status field 21 of the data fields of the pre-received Attach Command C3 and then transfers the rewritten one as a second Attach Command Response R3*b* to the control node 3 for processing. The value of each data field of the packet issued here is shown in (Table 10).

When the control node 3 has received the second Attach Command Response R3*b* from the data reception node 2*a* and recognized the completion of data transfer to the data reception node 2*a*, the control node 3 starts the operation for transferring data from the data transmission node 1 to the data reception node 2*b*. As this operation is the same as the aforementioned operation for transferring data from the data transmission node 1 to the data reception node 2 except that the reception node is changed from the data reception node 2*a* to the data reception node 2*b*, the detailed description of the operation will be omitted.

TABLE 10

SECOND ATTACH COMMAND RESPONSE R3b

| Data Field | Value |
| --- | --- |
| Node Identifier of Destination to which Packet is transmitted | Node Identifier of Control Node 3 |
| Node Identifier of Source from which Packet is transmitted | Node Identifier of Data Reception Node 2 |
| Asynchronous Connection Command Code | Direction that Connection is for Transfer of Asynchronous Data |
| Sub Function Field | Attach |
| Data File Number Field | Number of Data Files to be received (=1) |
| Register Address of Connection Source Node | Register Address of Data Reception Node 2 |
| Connection Destination Node Identifier | Node Identifier of Data Transmission Node 1 |
| Register Address of Connection Destination Node | Register Address of Data Transmission Node 1 |
| Status Field | Data Transfer is completed (=0x00) |

As described above, similarly to the fifth embodiment, when the number of data files to be received has been pre-determined, since the data transmission node 1 and the data reception node 2*a* carry out disconnection, the disconnection is achieved simultaneous with the completion of data transfer and therefore the number of commands issued on the bus is reduced. Further, since such disconnection is reported to the control node 3 as well, the control node 3 need not inquire of the state of transfer which is being carried out as a preparation for the next data transfer. Therefore, the number of commands issued on the bus is further reduced and shifting to the next transfer operation can be made more smoothly.

In the embodiments described above, cases in which the commands and responses are transferred using the AV/C commands are exemplarily described. However, other command transfer methods may be used instead of that using the AV/C command.

In addition, in the embodiments described above, cases in which IEEE 1394-1995 is employed are exemplarily described. However, the invention is not limited to this structure and any bus may be used as long as it is connectable to a plurality of devices simultaneously.

Further, in the embodiments described above, a case in which the control node is present independent of the node carrying out the data transmission/reception, a case in which the data transmission node includes the control node, and a case in which the data reception node includes the control node are described. However, in an actual system structure, the system may be constituted of the three devices, i.e. an independent control node, a data transmission node containing a control node, and a data reception node containing a control node. In such a case, the device on which a user carries out an operation like pushing a button functions as the control node.

Yet further, the term "a data transmission node" does not necessarily mean that the function of the node is fixed to transmission and the term "a data reception node" does not necessarily mean that the function of the node is fixed to reception. Depending on the types of commands issued by the control node, a node may function as either a data transmission node or a data reception node. For example, a system in which two digital still cameras are connected such that they can exchange data with each other can be established.

Industrial Applicability

By using the data transfer method of the present invention, a system can be realized which can flexibly adapt to various types of system structure, improve the process efficiency by reducing the number of commands to be issued, and the control node is capable of easily detecting the completion of data transfer and, when data transfer is continuously effected, the operation can smoothly proceed to the next data transfer, which simplifies the whole transfer control process.

What is claimed is:

1. A data transfer method of transferring at least one data file from a first node to a second node under control of a control node in a bus system, the first node and the second node having corresponding node identifiers, said data transfer method comprising:

transmitting to the first node a first command, including the node identifier of the second node and a data file number field; and transmitting to the second node a second command, including the node identifier of the first node;

wherein, when the data file number field specifies a number of 1 or more, the first node directs the second node to complete the data transfer when the first node has transmitted a number of data files matching the number specified in the data file number field; and wherein, when the data file number field specifies a 0, the first node continues to transmit data files until instructed by the control node to stop.

2. A data transfer method according to claim 1, further comprising:

notifying the control node when the first node completes the transmission of the number of data files specified in the data file number field, whenever the data file number field specifies a number of 1 or more.

3. A data transfer method according to claim 2, wherein the second node comprises the control node, and transmitting the second command to the second node and notifying the control node of the completed transmission are not issued on the bus.

4. A data transfer method of transferring at least one data file from a first node to a second node under control of a control node in a bus system, the first node and the second node having corresponding node identifiers, said data transfer method comprising:

transmitting to the first node a first command, including the node identifier of the second node; and transmitting to the second node a second command, including the node identifier of the first node and a data file number field;

wherein, when the data file number field specifies a number of 1 or more, the second node directs the first node to complete the data transfer when the second node has received a number of data files matching the number specified in the data file number field; and wherein, when the data file number field specifies a 0, the second node continues to receive data files until instructed by the control node to stop.

5. A data transfer method according to claim 4, further comprising:

notifying the control node when the second node completes the reception of the number of data files specified in the data file number field, whenever the data file number field specifies a number of 1 or more.

6. A data transfer method according to claim 5, wherein the first node comprises the control node, and transmitting the first command to the first node and notifying the control node of the completed transmission are not issued on the bus.

7. A data transfer system for transferring at least one data file through a bus, which interconnects a plurality of equipment, the data transfer system comprising:

a transmitter that transmits the at least one data file via the bus, the transmitter having a corresponding transmitter identifier;

a receiver that receives the at least one data file from the transmitter via the bus, the receiver having a corresponding receiver identifier; and a controller that sends at least one of a first command to the transmitter and a second command to the receiver, the first command comprising the receiver identifier and a first data file number field indicating a predetermined number of files to be transmitted, and the second command comprising the transmitter identifier and a second data file number field indicating a predetermined number of files to be received;

wherein, when the first data file number field and the second data number field each contain a zero, the transfer of the at least one data file from the transmitter to the receiver continues until the controller instructs one of the transmitter to stop transmitting and the receiver to stop receiving;

wherein, when the first data file number field contains a number greater than zero, the transfer of the at least one data file ends based on the transmitter determining that a number of transmitted data files equals the number greater than zero; and wherein, when the second data file number field contains the number greater than zero, the transfer of the at least one data file ends based on the receiver determining that a number of received data files equals the number greater than zero.

8. The data transfer system according to claim 7, wherein, when the first data file number field contains the number greater than zero, the transmitter instructs the receiver to stop receiving when the receiver receives a last transmitted data file.

9. The data transfer system according to claim 7, wherein, when the second data file number field contains the number greater than zero, the receiver instructs the transmitter to stop transmitting when the receiver receives a last transmitted data file.

10. The data transfer system according to claim 7, wherein, when one of the first data file number field and the second data file number field contains the number greater than zero, at least one of the transmitter and the receiver notifies the controller when the transfer of the at least one data file ends.

* * * * *